United States Patent
Higuchi

(10) Patent No.: US 8,711,250 B2
(45) Date of Patent: Apr. 29, 2014

(54) IMAGE SIGNAL PROCESSING APPARATUS AND IMAGE SIGNAL PROCESSING METHOD

(75) Inventor: Keiji Higuchi, Kunitachi (JP)

(73) Assignee: Olympus Corporation, Tokyo (JP)

( * ) Notice: Subject to any disclaimer, the term of this patent is extended or adjusted under 35 U.S.C. 154(b) by 340 days.

(21) Appl. No.: 13/023,695

(22) Filed: Feb. 9, 2011

(65) Prior Publication Data

US 2012/0200747 A1 Aug. 9, 2012

(51) Int. Cl.
*H04N 5/217* (2011.01)
*H04N 5/00* (2011.01)

(52) U.S. Cl.
USPC .......................................... 348/241; 348/607

(58) Field of Classification Search
USPC ......... 348/241, 194, 470, 533, 534, 535, 606, 348/607, 618, 683, 701, 243, 248, 255, 348/222.1; 382/260
See application file for complete search history.

(56) References Cited

U.S. PATENT DOCUMENTS

| 5,404,178 A * | 4/1995 | Kondo et al. ................. 348/618 |
| 6,067,125 A * | 5/2000 | May .............................. 348/607 |
| 7,599,569 B2 * | 10/2009 | Smirnov et al. ............... 382/260 |
| 7,916,187 B2 * | 3/2011 | Tsuruoka ....................... 348/241 |
| 8,428,386 B2 * | 4/2013 | Yoshimura et al. ........... 382/266 |
| 2008/0239090 A1 | 10/2008 | Ohwaki et al. |
| 2008/0239094 A1 | 10/2008 | Baqai et al. |
| 2009/0123085 A1* | 5/2009 | Yoshimura et al. ........... 382/264 |

FOREIGN PATENT DOCUMENTS

| CN | 101276464 A | 10/2008 |
| CN | 101282417 A | 10/2008 |
| CN | 101431593 A | 5/2009 |
| JP | 2000-152006 A | 5/2000 |
| JP | 2005-303802 | 10/2005 |
| JP | 2006-101006 A | 4/2006 |
| JP | 2007-336386 A | 12/2007 |
| JP | 2008-244591 A | 10/2008 |
| JP | 2009-118338 A | 5/2009 |

OTHER PUBLICATIONS

Japanese Office Action dated Apr. 16, 2013 from corresponding Japanese Patent Application No. 2009-237775, together with an English language translation.

* cited by examiner

*Primary Examiner* — Ahmed A Berhan
(74) *Attorney, Agent, or Firm* — Scully, Scott, Murphy & Presser, P.C.

(57) ABSTRACT

An image signal processing apparatus that performs a noise reduction process on an image signal of an image captured by an imaging device is provided. By performing a first smoothing process on an input signal of an image signal that is received from an imaging unit and that is subjected to a first image processing, a first smoothed signal creating unit creates a first smoothed signal in which noise is reduced. By performing a second smoothing process that is different from the first smoothing process on the input signal, the second smoothed signal creating unit creates a second smoothed signal in which noise is reduced. A mixing processing unit mixes the first smoothed signal and the second smoothed signal in accordance with a mixing ratio according to a value of the input signal.

8 Claims, 13 Drawing Sheets

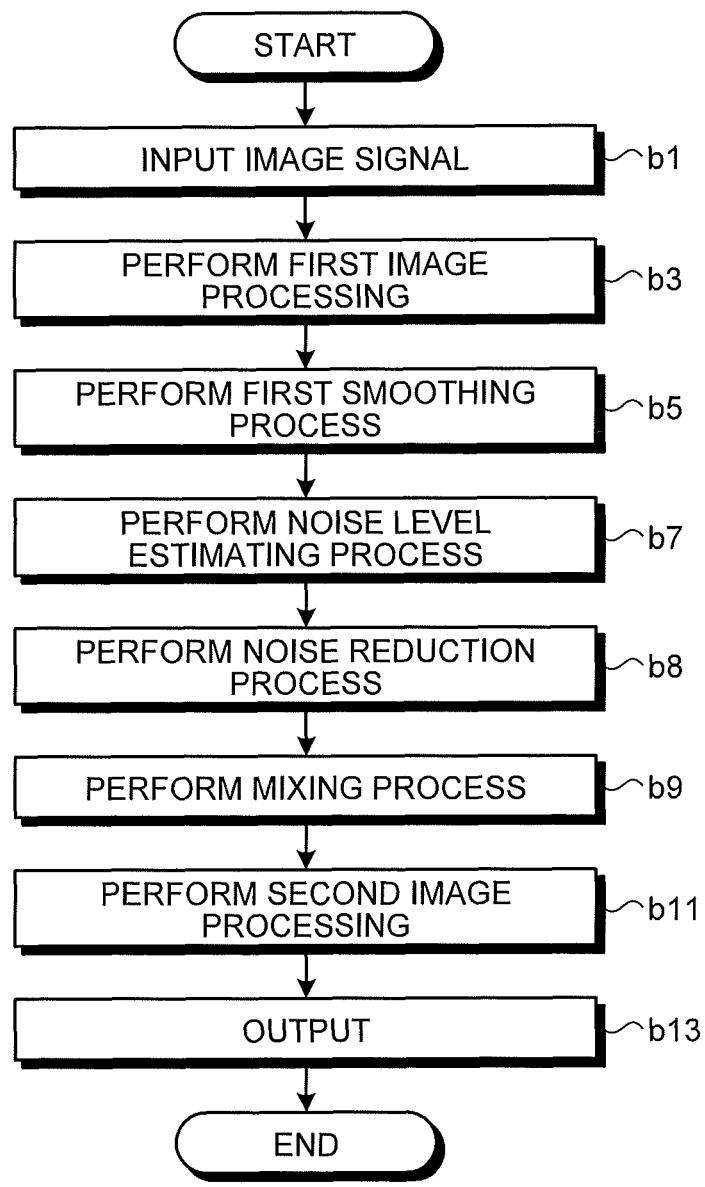

IMAGE SIGNAL PROCESSING APPARATUS AND IMAGE SIGNAL PROCESSING METHOD

BACKGROUND OF THE INVENTION

1. Field of the Invention

The present invention relates to an image signal processing apparatus and an image signal processing method that are used to perform a noise reduction process on an image signal of an image captured by an imaging device.

2. Description of the Related Art

Methods of reducing noise contained in image signals of images captured by imaging devices have been proposed. For example, in Japanese Patent Application Laid-open No. 2005-303802, the amount of noise that is to be generated by an imaging device to be used is modeled and the amount of noise contained in image signals is estimated in accordance with this noise generating model (reference noise model). Then, filtering (smoothing process) is performed using the estimated amount of noise, thus reducing the noise.

SUMMARY OF THE INVENTION

According to an aspect of the present invention, there is provided an image signal processing apparatus that performs a noise reduction process on an image signal of an image captured by an imaging device, the image signal processing apparatus including: a first smoothed signal creating unit that creates a first smoothed signal in which noise is reduced by performing a first smoothing process on the image signal; a second smoothed signal creating unit that creates a second smoothed signal in which noise is reduced by performing a second smoothing process that is different from the first smoothing process on the image signal; and a mixing processing unit that mixes the first smoothed signal and the second smoothed signal in accordance with a mixing ratio according to a value indicated by any one of the image signal, the first smoothed signal, and the second smoothed signal.

According to another aspect of the present invention, there is provided a non-transitory computer-readable storage medium with an executable program stored thereon for reducing noise of an image signal of an image captured by an imaging device, wherein the program instructs a microprocessor to perform: creating a first smoothed signal in which noise is reduced by performing a first smoothing process on the image signal; creating a second smoothed signal in which noise is reduced by performing a second smoothing process that is different from the first smoothing process on the image signal; and mixing the first smoothed signal and the second smoothed signal in accordance with a mixing ratio according to a value of any one of the image signal, the first smoothed signal, and the second smoothed signal.

According to still another aspect of the present invention, there is provided an image signal processing method of performing a noise reduction process on an image signal of an image captured by an imaging device, the image signal processing method including: creating a first smoothed signal in which noise is reduced by performing a first smoothing process on the image signal; creating a second smoothed signal in which noise is reduced by performing a second smoothing process that is different from the first smoothing process on the image signal; and mixing the first smoothed signal and the second smoothed signal in accordance with a mixing ratio according to a value of any one of the image signal, the first smoothed signal, and the second smoothed signal.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 19 is an overall flowchart illustrating the flow of a process performed by a CPU in a computer system according to a modification of the second embodiment.

DETAILED DESCRIPTION OF THE PREFERRED EMBODIMENTS

In the following, preferred embodiments of an image signal processing apparatus, an image signal processing program, and an image signal processing method according to the present invention will be described in detail with reference to the accompanying drawings. In the following description, an imaging system is described as an example of the image signal processing apparatus, the image signal processing program, and the image signal processing method according to the present invention; however, the present invention is not limited to these embodiments.

First Embodiment

Figure 1:
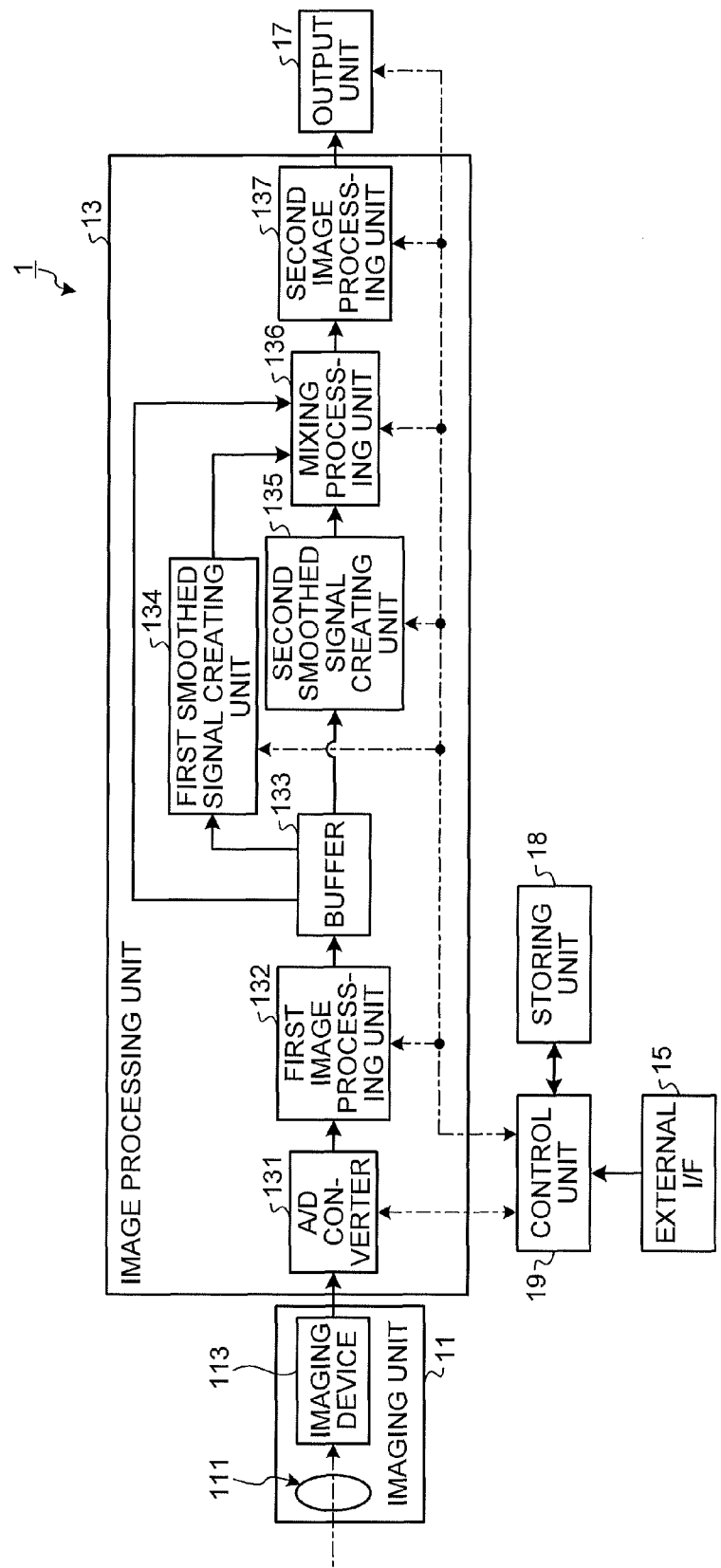
FIG. 1 is a block diagram illustrating an example of the overall configuration of an imaging system according to a first embodiment.

A first embodiment will be described first. In the first embodiment, an imaging system using an image signal processing apparatus according to the present invention will be described. FIG. 1 is a block diagram illustrating an example of the overall configuration of an imaging system 1 according to the first embodiment. As illustrated in FIG. 1, the imaging system 1 according to the first embodiment includes an imaging unit 11, an image processing unit 13, an external interface (interface) 15, an output unit 17, a storing unit 18, and a control unit 19 that controls the operation of each unit.

The imaging unit 11 includes a lens system 111 and an imaging device 113, such as a CCD or a CMOS. The lens system 111 includes, for example, an imaging lens that focuses light from a subject onto the imaging device 113. The imaging device 113 is, for example, a single imaging device in which Bayer-array RGB primary color filters are arranged on a monochrome imaging device; performs photoelectric conversion on the light received from the subject via the lens system 111; and creates an analog image signal. This image signal is input to an A/D converter 131 in the image processing unit 13.

The image processing unit 13 performs various kinds of image processing on the image signal that is input from the imaging unit 11. The image processing unit 13 includes the A/D converter 131, a first image processing unit 132, a buffer 133, a first smoothed signal creating unit 134, a second smoothed signal creating unit 135, a mixing processing unit 136, and a second image processing unit 137. In the image processing unit 13, the A/D converter 131, the first image processing unit 132, the buffer 133, the second smoothed signal creating unit 135, the mixing processing unit 136, and the second image processing unit 137 are connected in this order. The buffer 133 is also connected to the first smoothed signal creating unit 134 and the mixing processing unit 136. The first smoothed signal creating unit 134 is connected to the mixing processing unit 136. As will be described later, an image signal (RGB image signal), which is obtained by being processed by each unit forming the image processing unit 13, is output from the second image processing unit 137 and is input to the output unit 17. In FIG. 1, a data signal line that transmits a data signal, such as an image signal, by connecting each unit in the image processing unit 13 is indicated by a solid line and a control signal line that transmits a control signal is indicated by a broken line.

The A/D converter 131 performs A/D conversion on the image signal that is input from the imaging device 113 to form digital data. The processed image signal is output to the first image processing unit 132.

The first image processing unit 132 performs, as a first image processing on the image signal received from the A/D converter 131, image processing, such as a gain adjustment process or a white balance correction process. The image processing that is performed, as the first image processing, by the first image processing unit 132 is not limited thereto. It is possible to appropriately perform image processing as needed. The image signal that has been subjected to image processing is output to the buffer 133 as an input signal.

The buffer 133 temporarily stores therein a value of the image signal, which is subjected to the first image processing by the first image processing unit 132 and is output as an input signal, by sequentially updating the value of the input signal that is input from the first image processing unit 132. The input signal stored in the buffer 133 is read by the first smoothed signal creating unit 134, the second smoothed signal creating unit 135, and the mixing processing unit 136 and is used for processes in these units.

The first smoothed signal creating unit 134 reads the value of the input signal stored in the buffer 133 and performs a first smoothing process on the input signal for each RGB color. In the first embodiment, the first smoothed signal creating unit 134 performs, as the first smoothing process, a smoothing process using, for example, an averaging filter. The image signal that has been subjected to the first smoothing process is output to the mixing processing unit 136 as a first smoothed signal. Here, the averaging filter calculates the average value of pixel values in a predetermined pixel region (for example 3×3 pixels or 5×5 pixels, etc.). If the smoothing process is performed using this averaging filter, a smoothed image signal is created that is blur-emphasized with respect to the image signal (input signal) that has not been subjected to the process.

The smoothing process that is performed as the first smoothing process is not limited to the smoothing process using the averaging filter. For example, it is possible to perform a smoothing process, as the first smoothing process, using a weighted averaging filter, such as the Gaussian filter.

The second smoothed signal creating unit 135 reads the value of the input signal stored in the buffer 133 and performs, on this input signal, a second smoothing process that is different from the first smoothing process performed by the first smoothed signal creating unit 134. In the first embodiment, the second smoothed signal creating unit 135 performs a smoothing process, as the second smoothing process, that uses a bilateral filter. The image signal that has been subjected to the second smoothing process is output to the mixing processing unit 136 as a second smoothed signal.

The bilateral filter mentioned here produces a smoothing effect on a portion other than edges while maintaining the edges. Accordingly, if the smoothing process is performed using the bilateral filter, it is possible to create a smoothed image signal in which the edges are maintained with respect to the image signal (input signal) that has not been subjected to the smoothing process. For example, two types of weight are set in the bilateral filter. Specifically, one weight is a value related to a pixel value difference between a target pixel and a neighboring pixel, i.e., the smaller the pixel value difference is, the greater the weight is to be set. Accordingly, a pixel, such as a pixel on an edge boundary portion, where the absolute value of the pixel value difference between that pixel and a neighboring pixel is large is hardly used for the smoothing process. Thus, an effect that edges do not become blurred can be obtained. In contrast, the other weight is a value related to the distance between a target pixel and a neighboring pixel, i.e., the shorter the distance is, the greater the weight is to be set. Accordingly, if pixels having the same pixel value are present at a short distance and at a far distance, respectively, it is assumed that the pixel at the short distance has a higher correlation with the target pixel than the pixel at the far distance in terms of the pixel value, thus allowing the weight of the pixel at the short distance to be large. This is done on the assumption that the correlation of the pixel value becomes low as the distance to the target pixel increases (on the assumption that pixels having the same pixel value at the far distance do not have the same pixel value but have noise therein). Accordingly, the pixel at the far distance from the neighboring pixel is hardly used for the smoothing process.

The smoothing process performed as the second smoothing process is not limited to the smoothing process using the bilateral filter. For example, it is possible to perform the smoothing process, as the second smoothing process, using an edge preserving filter, such as a median filter or a k-nearest neighbor averaging filter.

The mixing processing unit 136 mixes the first smoothed signal that is input from the first smoothed signal creating unit 134 and the second smoothed signal that is input from the second smoothed signal creating unit 135 in accordance with predetermined mixing ratios. The processed image signal is output to the second image processing unit 137 as a mixed image signal. Each of the mixing ratios of the first smoothed signal and the second smoothed signal can be appropriately determined such that the total value is 1. In the first embodiment, the mixing ratio is determined in such a manner that, in a bright portion, the mixing ratio of the second smoothed signal, which is the smoothed image signal in which edges are maintained, is high, whereas, in a dark portion, the mixing ratio of the first smoothed signal, which is a blur-emphasized smoothed image signal, is high.

Figure 2:
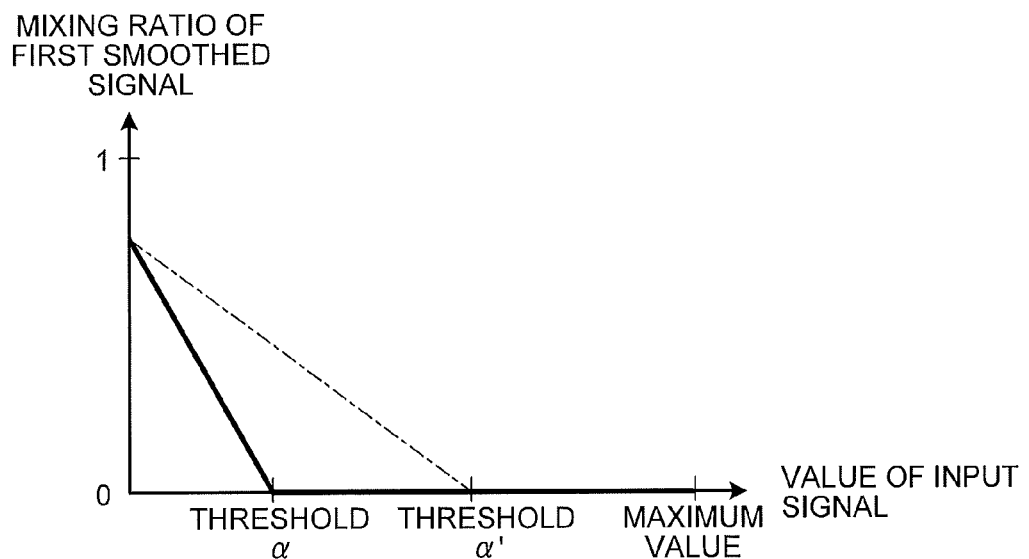
FIG. 2 is a schematic diagram illustrating a method of determining a mixing ratio according to the first embodiment.
Figure 3:
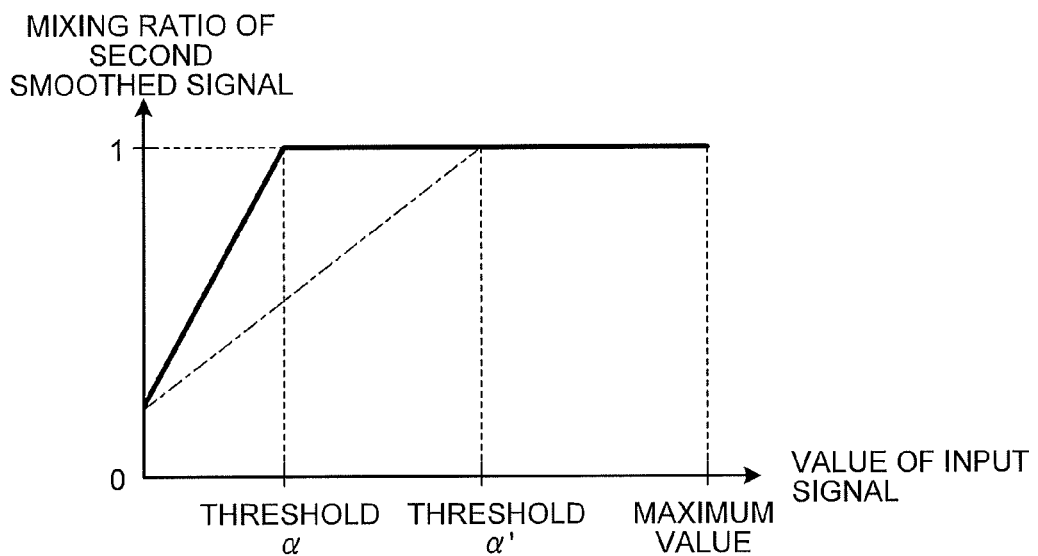
FIG. 3 is another schematic diagram illustrating the method of determining the mixing ratio according to the first embodiment.

Specifically, the mixing processing unit 136 reads a value of the input signal stored in, for example, the buffer 133 and determines the mixing ratio in accordance with the value of the input signal. Then, in accordance with the determined mixing ratio, the mixing processing unit 136 mixes the first smoothed signal and the second smoothed signal. FIGS. 2 and 3 are schematic diagrams illustrating a method of determining the mixing ratio according to the first embodiment. In FIG. 2, the mixing ratio of the first smoothed signal is plotted against the value of the input signal. In contrast, in FIG. 3, the mixing ratio of the second smoothed signal is plotted against the value of the input signal. In the first embodiment, as illustrated in FIGS. 2 and 3, the value of the input signal is subjected to a threshold process using a predetermined threshold α that is a first threshold. Then, for a bright portion in which a value of the input signal is equal to or greater than the threshold α, the mixing processing unit 136 determines, as a fixed value, that the mixing ratio of the first smoothed signal is "0" and the mixing ratio of the second smoothed signal is "1". In contrast, for a dark portion in which a value of the input signal is smaller than the threshold α, the mixing processing unit 136 determines each of the mixing ratios such that, as a value of the input signal approaches "0", i.e., becomes darker, the mixing ratio of the first smoothed signal becomes high and the mixing ratio of the second smoothed signal becomes low.

The values of the mixing ratios of the first smoothed signal and the second smoothed signal with respect to the input signal are previously set and stored in the storing unit 18. For example, the storing unit 18 stores therein the threshold α illustrated in FIGS. 2 and 3 and stores therein the inclinations of each of the mixing ratios of the first smoothed signal and the second smoothed signal that are less than the threshold α. Alternatively, it is possible to use a look-up table in which a value of each of the mixing ratios of the first smoothed signal and the second smoothed signal is associated with a value of the input signal that is less than the threshold α and to store, in the storing unit 18, the look-up table together with the threshold α. Furthermore, the value of the threshold α or the values of the mixing ratios of the first smoothed signal and the second smoothed signal with respect to the input signal that is less than the threshold α can be a fixed value or can be a variable value that is set in accordance with an external input, such as an operation input by a user.

In the first embodiment, a smoothed image signal in which an edge is maintained is created as the second smoothed signal is created. Accordingly, it is possible to obtain, in the bright portion, a high quality image signal in which an edge is maintained. In the dark portion, the first smoothed signal and the second smoothed signal are preferably mixed such that noise is less noticeable. Accordingly, the threshold α is preferably set on the dark side; however, the threshold α can appropriately be set. For example, a threshold α' illustrated in FIGS. 2 and 3 can be set on the bright side or the mixing ratio can be determined like that indicated by the dashed line instead of the solid lines illustrated in FIGS. 2 and 3.

As described above, by previously setting the threshold α and by setting the mixing ratio using the threshold α, the range of brightness in which the first smoothed signal and the second smoothed signal are mixed (the region less than the threshold α in the example illustrated in FIGS. 2 and 3) can be easily adjusted, and the mixing ratio can be adjusted in a flexible manner. In contrast, in the dark portion at which the brightness is less than the threshold α, the mixing ratio can be set by making the mixing ratio smoothly vary; therefore, it is possible to obtain a natural and high quality image signal without a rapid change in the image quality. If the threshold α is variably set in accordance with the operation input by a user, the user can view and observe an image mixed at a desired mixing ratio.

Figure 4:
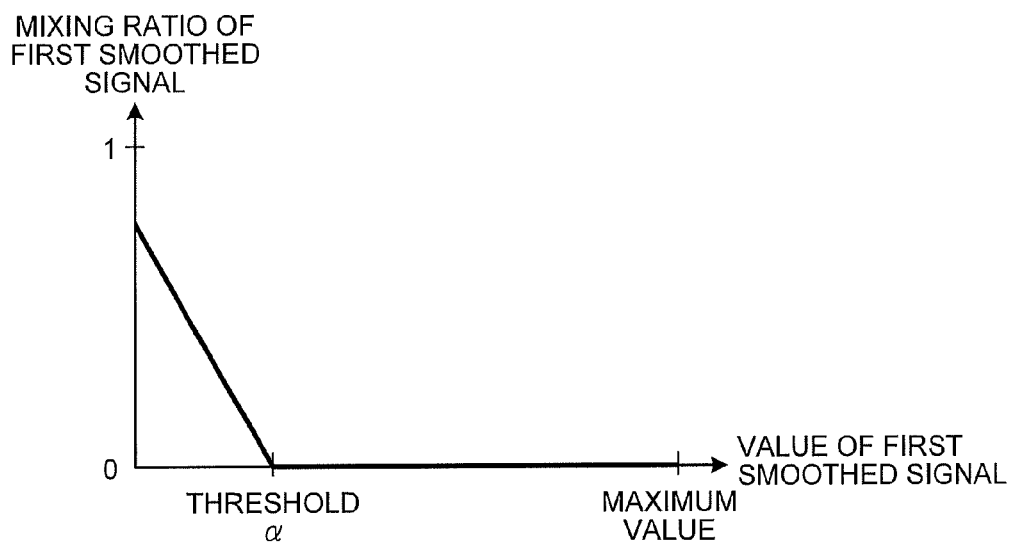
FIG. 4 is a schematic diagram illustrating a method of determining a mixing ratio according to a modification of the first embodiment.
Figure 5:
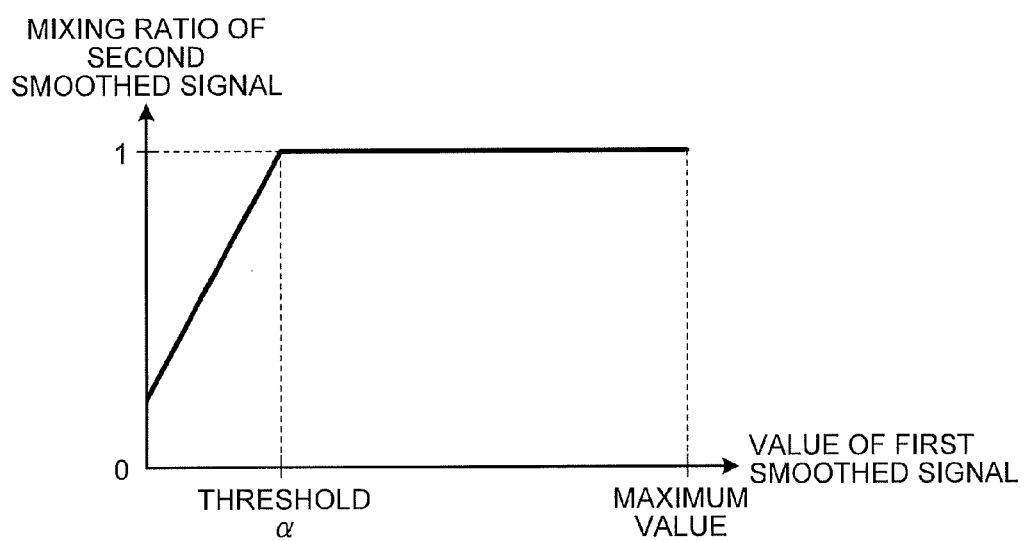
FIG. 5 is another schematic diagram illustrating the method of determining the mixing ratio according to the modification of the first embodiment.

A case is exemplified above in which the mixing ratios of the first smoothed signal and the second smoothed signal are determined in accordance with the value of the input signal; however, the present invention is not limited thereto. For example, the mixing ratio can be determined in accordance with a value of the first smoothed signal. FIGS. 4 and 5 are schematic diagrams illustrating a method of determining a mixing ratio according to a modification of the first embodiment. In FIG. 4, the mixing ratio of the first smoothed signal is plotted against the value of the first smoothed signal. In contrast, in FIG. 5, the mixing ratio of the second smoothed signal is plotted against the value of the first smoothed signal. In this case, the mixing processing unit 136 determines, in accordance with the value of the first smoothed signal, each of the mixing ratios of the first smoothed signal and the second smoothed signal and performs a mixing process, in accordance with the determined mixing ratio, on the first smoothed signal and the second smoothed signal.

Figure 6:
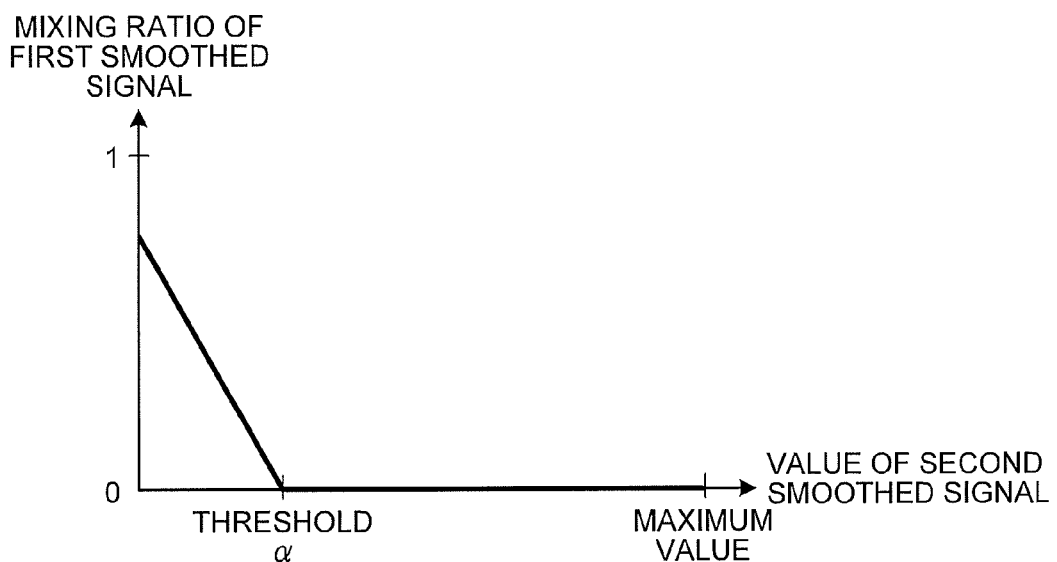
FIG. 6 is a schematic diagram illustrating a method of determining a mixing ratio according to another modification of the first embodiment.
Figure 7:
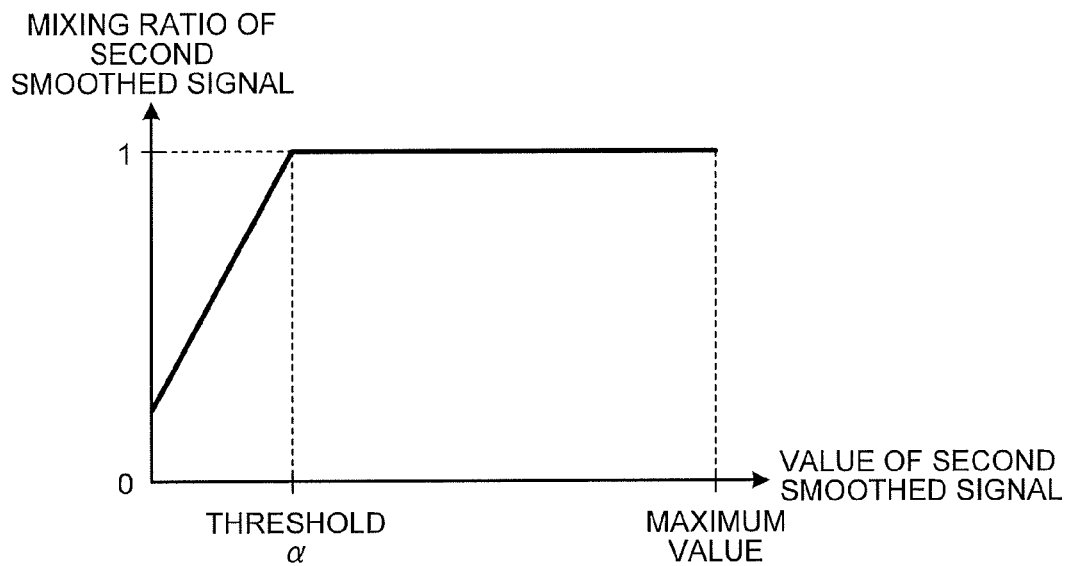
FIG. 7 is a schematic diagram illustrating the method of determining the mixing ratio according to the modification of the first embodiment.

Alternatively, the mixing ratio can be determined in accordance with the second smoothed signal. FIGS. 6 and 7 are schematic diagrams illustrating a method of determining the mixing ratio according to a modification. Here, in FIG. 6, the mixing ratio of the first smoothed signal is plotted against the value of the second smoothed signal. In contrast, in FIG. 7, the mixing ratio of the second smoothed signal is plotted against the value of the second smoothed signal. In this case, the mixing processing unit 136 determines, in accordance with the value of the second smoothed signal, each of the mixing ratios of the first smoothed signal and the second smoothed signal and performs a mixing process, in accordance with the determined mixing ratio, on the first smoothed signal and the second smoothed signal.

Figure 8:
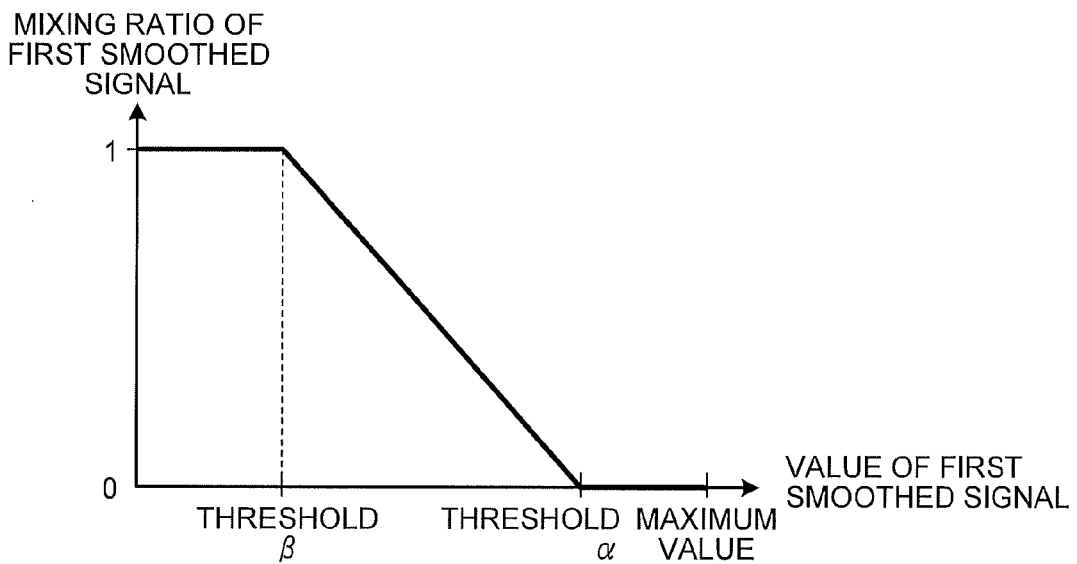
FIG. 8 is a schematic diagram illustrating a method of determining a mixing ratio according to still another modification of the first embodiment.
Figure 9:
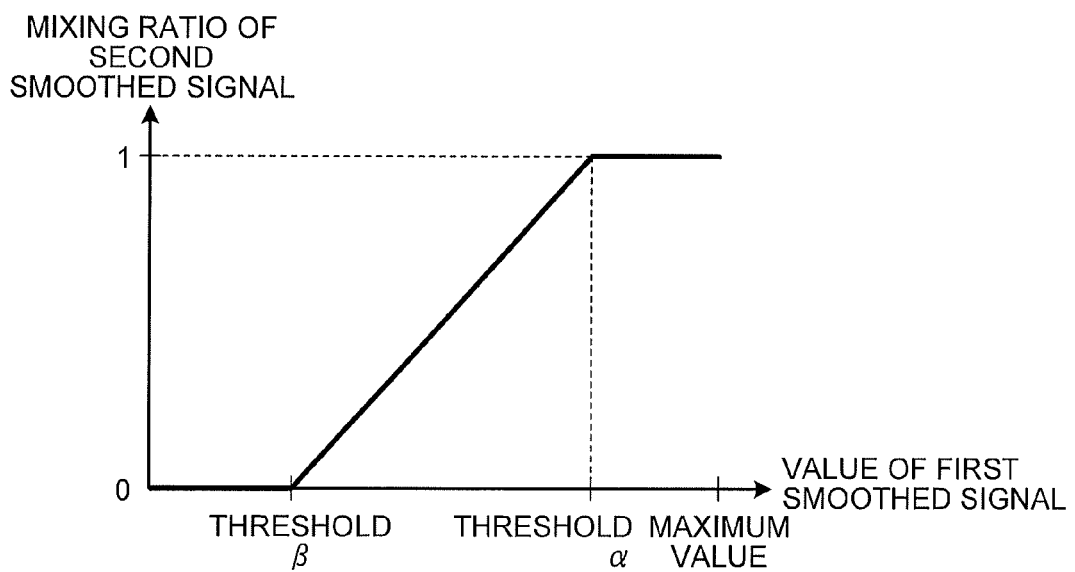
FIG. 9 is a schematic diagram illustrating the method of determining the mixing ratio according to the modification of the first embodiment.

In the method of determining the mixing ratio described above, one single value α is used as a threshold; however, two or more thresholds can be used. FIGS. 8 and 9 are schematic diagrams illustrating a method of determining the mixing ratio according to a modification. Here, in FIG. 8, the mixing ratio of the first smoothed signal is plotted against the value of the first smoothed signal. In contrast, in FIG. 9, the mixing ratio of the second smoothed signal is plotted against the value of the first smoothed signal.

In the modification, as illustrated in FIGS. 8 and 9, the value of the first smoothed signal is subjected to a threshold process using two thresholds: a predetermined threshold α and a predetermined threshold β that is a second threshold and that is smaller than the threshold α. Then, for a bright portion in which a value of the first smoothed signal is greater than the threshold α, the mixing processing unit 136 determines that each of the mixing ratios of the first smoothed signal and the second smoothed signal is a fixed first mixing ratio. For example, the mixing processing unit 136 determines, as a fixed value, that the mixing ratio of the first smoothed signal is "0" and the mixing ratio of the second smoothed signal is "1". In contrast, for a dark portion in which a value of the first smoothed signal is smaller than the threshold β, the mixing processing unit 136 determines that each of the mixing ratios of the first smoothed signal and the second smoothed signal is a fixed second mixing ratio. For example, the mixing processing unit 136 determines, as a fixed value, that the mixing ratio of the first smoothed signal is "1" and the mixing ratio of the second smoothed signal is "0".

That is, in the modification, at the threshold α or more, the mixing ratio of the second smoothed signal, from which a high quality image with an edge being maintained is obtained in a bright portion, is set to "1". At the threshold β or below, the mixing ratio of the first smoothed signal, from which blur-emphasized image with less noise is obtained in a dark portion, is set to "1". Furthermore, the first smoothed signal is mixed with the second smoothed signal in an intermediate portion in which the brightness is an intermediate level therebetween. In an intermediate bright portion in which a value of the first smoothed signal is equal to or lower than the threshold α and is equal to or greater than the threshold β, each of the mixing ratios is determined such that as the value of the first smoothed signal decreases, i.e., becomes darker, the mixing ratio of the first smoothed signal becomes higher and the mixing ratio of the second smoothed signal becomes lower.

Specifically, the mixing ratio of the first smoothed signal is determined in accordance with Equation (1) and the mixing ratio of the second smoothed signal is determined in accordance with Equation (2) below:

$$\text{mixing ratio of the first smoothed signal} = (\alpha - \text{value of the first smoothed signal})/(\alpha - \beta) \quad (1)$$

$$\text{mixing ratio of the second smoothed signal} = (\text{value of the first smoothed signal} - \beta)/(\alpha - \beta) \quad (2)$$

In the modification, a case is exemplified in which each of the mixing ratios of the first smoothed signal and the second smoothed signal with respect to the value of the first smoothed signal is determined. However, the mixing ratio can also be determined in accordance with the value of the input signal or a value of the second smoothed signal.

Figure 10:
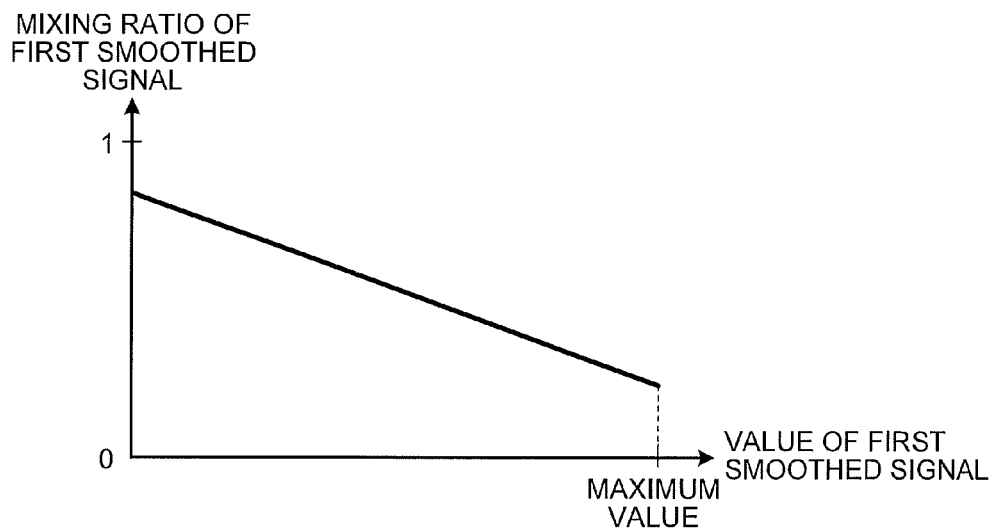
FIG. 10 is a schematic diagram illustrating a method of determining a mixing ratio according to still another modification of the first embodiment.
Figure 11:
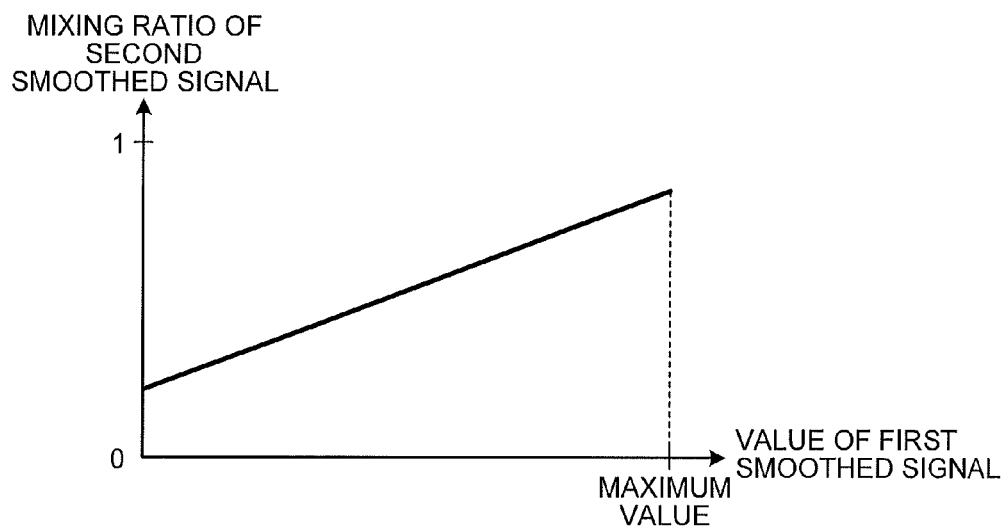
FIG. 11 is another schematic diagram illustrating the method of determining the mixing ratio according to the modification of the first embodiment.

Furthermore, the method of determining each of the mixing ratios of the first smoothed signal and the second smoothed signal is not limited to the method using one or more thresholds described in FIGS. 2 to 9. The mixing ratios can also be determined without setting a threshold. FIGS. 10 and 11 are schematic diagrams illustrating a method of determining the mixing ratio according to a modification. FIG. 10 is a chart in which the mixing ratio of the first smoothed signal is plotted against the value of the first smoothed signal. In contrast, FIG. 11 is a chart in which the mixing ratio of the second smoothed signal is plotted against the value of the first smoothed signal. In this case, each of the mixing ratios is determined such that the mixing ratio of the first smoothed signal is set, within the range of possible values of the first smoothed signal, to be high and the mixing ratio of the second smoothed signal is set to be low as the value of the first smoothed signal approaches "0", i.e., becomes darker. In the modification, a case is exemplified in which each of the mixing ratios of the first smoothed signal and the second smoothed signal with respect to the first smoothed signal is determined; however, the mixing ratios can also be determined in accordance with a value of the input signal or the value of the second smoothed signal.

The second image processing unit 137 performs second image processing on a value of an image signal that is input from the mixing processing unit 136. Examples of the second image processing include an interpolation process, a color conversion process, a grayscale conversion process, an edge detecting process, an edge enhancement process, and a false color reducing process. The type of the image processing performed by the second image processing unit 137 as the second image processing is not limited thereto. It is possible to appropriately use image processing as needed. The processed image signal (RGB image signal) is output to the output unit 17.

The output unit 17 includes a display unit and a recording unit that records the subject images. The display unit displays, in colors in accordance with the input image signal, an image (subject image) captured by the imaging unit 11 and also displays various screens, such as setting screens, for setting the operating environment of the imaging system 1. The display unit is implemented by, for example, a display device, such as an LCD or an EL display. The recording unit is implemented by various IC memories, such as an updatable and recordable flash memory including a ROM or a RAM; a built-in hard disc drive or a hard disc drive that is connected by a data communication terminal; various recording media, such as a CD-ROM; and a reading device thereof.

The external I/F 15 is an interface device for, for example, a change-over operation for various modes, such as a capture mode; a setting operation for capture conditions, such as the capture size; and a change-over operation for turning on or off a power supply. In addition to the above, a user can instruct, via the external I/F 15 as needed, a setting screen to be displayed on the display unit included in the output unit 17. The external I/F 15 is implemented by, for example, various operating units, such as a button switch or a dial, and an input device, such as a mouse, a touch panel, or a keyboard. The external I/F 15 outputs, to the control unit 19, an operation signal thereof.

The storing unit 18 is implemented by various IC memories, such as an updatable and recordable flash memory including a ROM or a RAM; a built-in hard disc drive or a hard disc drive that is connected by a data communication terminal; various recording media, such as a CD-ROM; and a reading device thereof. The storing unit 18 stores therein a program that operates the imaging system 1 and that implements various functions included in the imaging system 1 and stores therein data used during the execution of the program and data necessary for the operation for each unit included in the image processing unit 13. The program and data are appropriately updated and stored in the storing unit 18.

The control unit 19 is electrically connected to each unit included in the imaging system 1 using a control signal line and performs overall operation control of each unit. The control unit 19 controls, for example, an operation of the imaging unit 11; sets, in accordance with an operation received from a user via the external I/F 15, parameter values of various processes; and informs each unit of the parameter values of various processes. The control unit 19 is implemented by, for example, a microcomputer (microprocessor) that includes an internal memory that stores therein various data or programs necessary for operation control of each unit.

As described above, according to the first embodiment, it is possible to create the first smoothed signal by performing, on an input signal, a smoothing process using, for example, the averaging filter and is possible to create the second smoothed signal by performing, on an input signal, a smoothing process using, for example, a bilateral filter. Furthermore, it is possible to perform the mixing process on the first smoothed signal and the second smoothed signal at the mixing ratios in accordance with, for example, the input signal. Accordingly, it is possible to mix two different smoothed signals having blurring and state of edge preservation, respectively.

Specifically, in the first embodiment, it is possible to mix the first smoothed signal and the second smoothed signal by increasing the mixing ratio of the second smoothed signal, which is obtained as a high quality smoothed image signal in which edges are maintained in a bright portion, and by increasing the mixing ratio of the first smoothed signal, which is obtained as a smoothed image signal in which the blurring is emphasized and noise is less noticeable in a dark portion. Accordingly, resolution can be maintained in a bright portion using the first smoothed signal in which edges are maintained. In contrast, it is possible to make noise less noticeable in a dark portion using the first smoothed signal in which the blurring is emphasized. Therefore, even when an image is bright or dark, even when a dark portion is present in a bright image or a bright portion is present in a dark image, or even when a bright portion and a dark portion are present in a mixed manner, it is possible to reduce the appearance of a portion in which a noise reduction effect is low and it is possible to effectively reduce noise over the entire image.

Furthermore, by adjusting the mixing ratio, image signals having various states of edge preservation can be obtained; therefore, it is possible to provide an image with the image quality desired by a user who views or observes the image signals. For example, in the first embodiment, the smoothing process is performed by combining the first smoothing process that effectively reduces noise of the dark image signal and the second smoothing process that effectively reduces noise of the bright image signal. Accordingly, for example, as in the case of applying the imaging system 1 to an endoscope, if a dark place is closely viewed or observed, the mixing ratio of the first smoothed signal that effectively reduces noise of a dark image can be made higher. In contrast, if a bright place is closely viewed or observed, the mixing ratio of the second smoothed signal that effectively reduces noise of a bright image can be made higher.

The combination of the first smoothing process performed by the first smoothed signal creating unit 134 and the second smoothing process performed by the second smoothed signal creating unit 135 described in the first embodiment is not particularly limited thereto. For example, in addition to the averaging filter, the bilateral filter, the Gaussian filter, the median filter, and the k-nearest neighbor averaging filter, it is possible to perform two smoothing processes using, in combination, a known filter, such as a differential filter, a trilateral filter, and a direction dependent filter, that performs a one-dimensional smoothing process in a predetermined direction. It is possible to configure the system such that the combination of the smoothing processes is defined to be the combination of the first smoothing process performed by the first smoothed signal creating unit 134 and the second smoothing process performed by the second smoothed signal creating unit 135 and then the mixing processing unit 136 mixes the processed results.

Furthermore, in the first embodiment, the imaging system has been described, in which a subject is captured using the imaging unit 11 and the subject image is output; however, the apparatus used in the present invention is not limited to the imaging apparatus that integrally includes the imaging device described above. For example, it is also possible to use an image signal processing apparatus that externally inputs an image signal of an image captured by another separately arranged imaging apparatus. For example, with such an image signal processing apparatus, an image signal can be externally input via a portable recording medium or input from an external device using a communication connection and then the image signal can be subjected to image processing.

Furthermore, in the first embodiment a case is described in which the single-plate imaging device 113 is used as the imaging unit 11. However, it is also possible to use, as the imaging unit 11, a three-plate imaging device that includes, for example, a prism that splits incident light into the wavelength of RGB light. Furthermore, the imaging system is not limited to a color image signal. It is also possible to use the imaging system for a monochrome image signal.

Furthermore, in the first embodiment, each unit included in the image processing unit 13 is configured as hardware; however, the configuration is not limited thereto. For example, a CPU can perform processes performed by each unit and execute a program, thus implementing it as software. Alternatively, a part of the process performed by each unit can be configured as software.

If the imaging apparatus is separately arranged and the process performed by each unit in the image processing unit 13 is implemented as software, it is possible to use a known computer system, such as a workstation or a personal computer, as an image signal processing apparatus. A program (image signal processing program) for implementing the process performed by each unit in the image processing unit 13 is prepared in advance, and the image signal processing program is executed by the CPU in the computer system.

Figure 12:
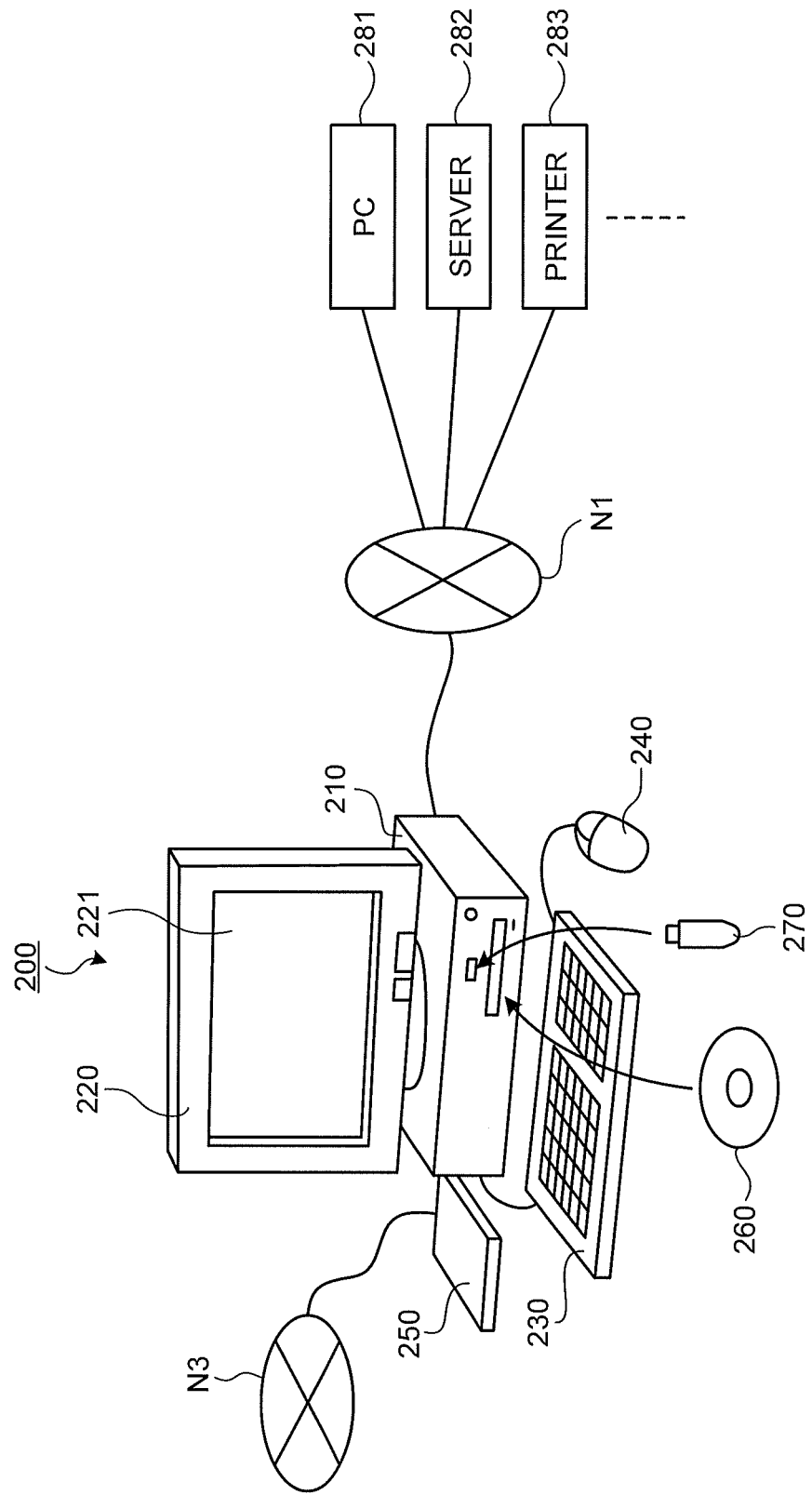
FIG. 12 is a schematic diagram illustrating the configuration of a computer system according to the modification of the first embodiment.
Figure 13:
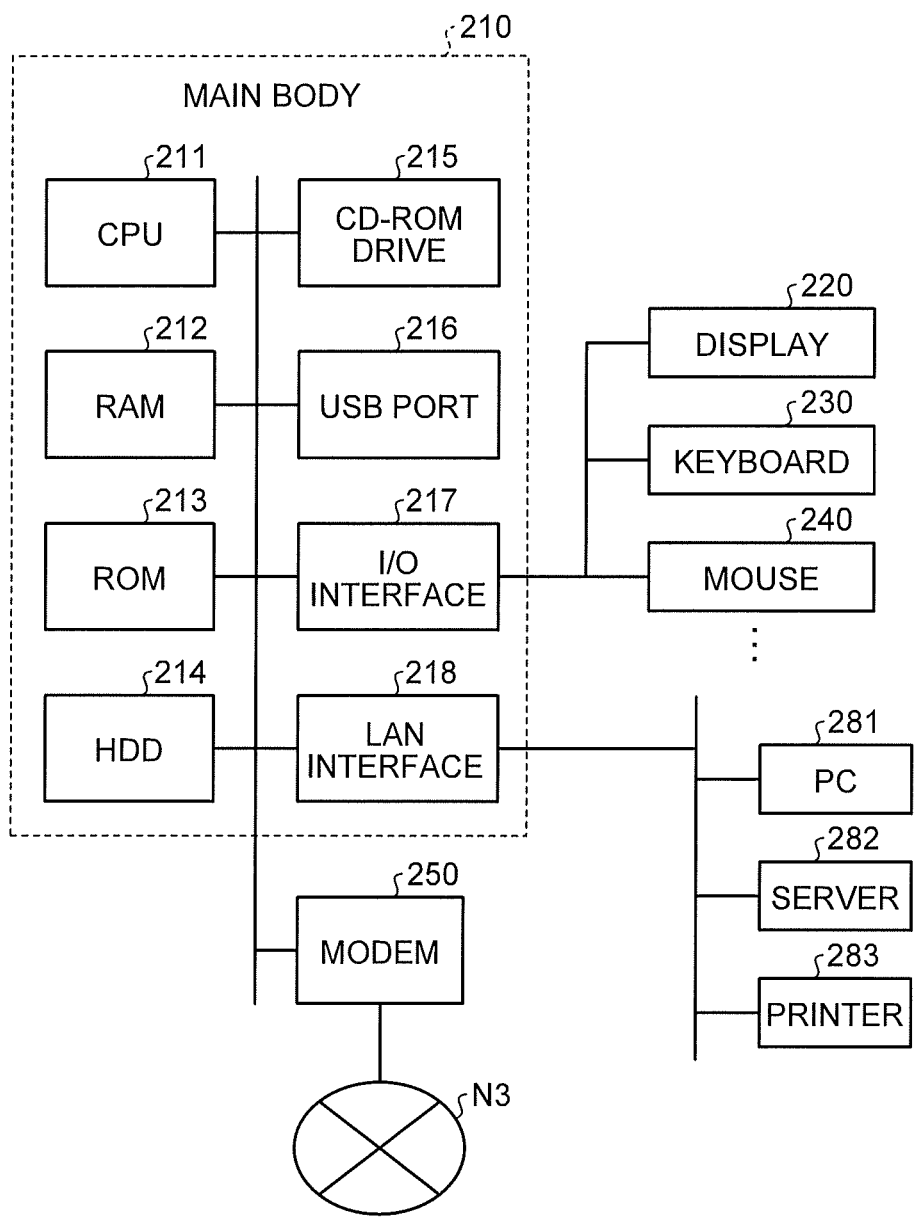
FIG. 13 is a block diagram illustrating the configuration of a main body of the computer system according to the modification of the first embodiment.

FIG. 12 is a schematic diagram illustrating the configuration of a computer system 200 according to the modification. FIG. 13 is a block diagram illustrating the configuration of a main body 210 in the computer system 200. As illustrated in FIG. 12, the computer system 200 includes the main body 210; a display 220 that displays information, such as image, on a display screen 221 in accordance with an instruction from the main body 210; a keyboard 230 that is used to input various kinds of information to the computer system 200; and a mouse 240 that specifies a given position on the display screen 221 of the display 220.

As illustrated in FIGS. 12 and 13, the main body 210 in the computer system 200 includes a CPU 211, a RAM 212, a ROM 213, a hard disk drive (HDD) 214, a CD-ROM drive 215 that receives a CD-ROM 260, a USB port 216 that is detachably connected to a USB memory 270, the display 220, an I/O interface 217 that is connected to the keyboard 230 and to the mouse 240, and a LAN interface 218 that is used to connect to a local area network or a wide area network (LAN/WAN) N1.

Furthermore, a modem 250 for connecting to a public circuit N3, such as the Internet, is connected to the computer system 200. A personal computer (PC) 281, a server 282, a printer 283, and the like, which is another computer system, are also connected to the computer system 200 via the LAN interface 218 and the local area network or a wide area network N1.

Figure 14:
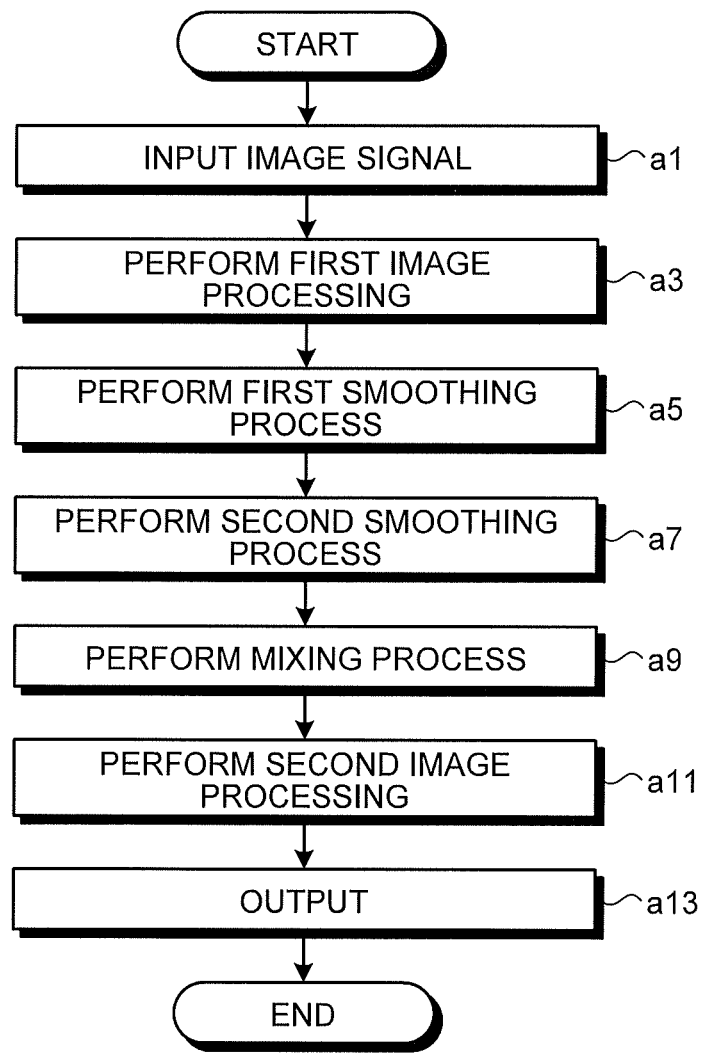
FIG. 14 is an overall flowchart illustrating the flow of a process performed by a CPU in a computer system according to the modification of the first embodiment.

By reading and implementing an image signal processing program (for example, an image signal processing program for implementing the process illustrated in FIG. 14) stored in a predetermined recording medium, the computer system 200 implements the image signal processing apparatus. The predetermined recording medium mentioned here includes any kind of recording medium, which stores therein the image signal processing program that is read by the computer system 200, such as a "portable physical medium" including the CD-ROM 260, the USB memory 270, an MO disk, a DVD disk, a flexible disk (FD), a magneto-optic disk, and an IC card; a "fixed physical medium" including the HDD 214, the RAM 212, and the ROM 213 arranged internally or externally in the computer system 200; and a "communication medium", which stores therein a program for a short period of time during the transmission of the program, such as, a public circuit N3 connected via the modem 250, and the local area network or the wide area network N1 to which another computer system (PC) 281 or a server 282 is connected.

Specifically, the image signal processing program is stored in a computer readable recording medium, such as the "portable physical medium", the "fixed physical medium", and the "communication medium". By reading and executing the image signal processing program from such recording media, the computer system 200 implements the image signal processing apparatus. The implementation of the image signal processing program is not limited to the computer system 200. The present invention can also be used in a case in which the other computer system (PC) 281 or the server 282 implements the image signal processing program or in a case in which both of them cooperatively implement the image signal processing program.

FIG. 14 is an overall flowchart illustrating the flow of a process performed by the CPU 211 in the computer system 200 according to the modification. The process described here can be implemented by the CPU 211 executing the image signal processing program stored in the predetermined recording medium described above.

As illustrated in FIG. 14, first, the CPU 211 receives, via a portable recording medium or from an external device using a communication connection, an image signal of an image captured by an imaging apparatus constructed by a single imaging device (Step a1). Then, the CPU 211 performs the first image processing on the value of the image signal that is input at Step a1 (Step a3). Subsequently, the CPU 211 performs the first smoothing process using, for example, the averaging filter on the image signal that has been subjected to the first image processing and then creates the first smoothed signal (Step a5). Furthermore, the CPU 211 performs the second smoothing process by using, for example, the bilateral filter, on the image signal that has been subjected to the first image processing and then creates the second smoothed signal (Step a7). Then, the CPU 211 mixes, at a predetermined mixing ratio, the first smoothed signal created at Step a5 and the second smoothed signal created at Step a7 and then creates a mixed image signal (Step a9). The mixing ratio of the first smoothed signal and the second smoothed signal is determined, in a similar manner as in the first embodiment, in accordance with any one of the input signal, the first smoothed signal, and the second smoothed signal.

Then, the CPU 211 performs the second image processing on the mixed image signal (Step a11). Thereafter, the CPU 211 outputs an image signal (RGB image signal) that has been subjected to the second image processing (Step a13). For example, the CPU 211 displays, on the display 220 illustrated in FIG. 14, the image signal that has been subjected to the second image processing or stores the image signal in a predetermined recording medium, such as the USB memory 270.

Second Embodiment

Figure 15:
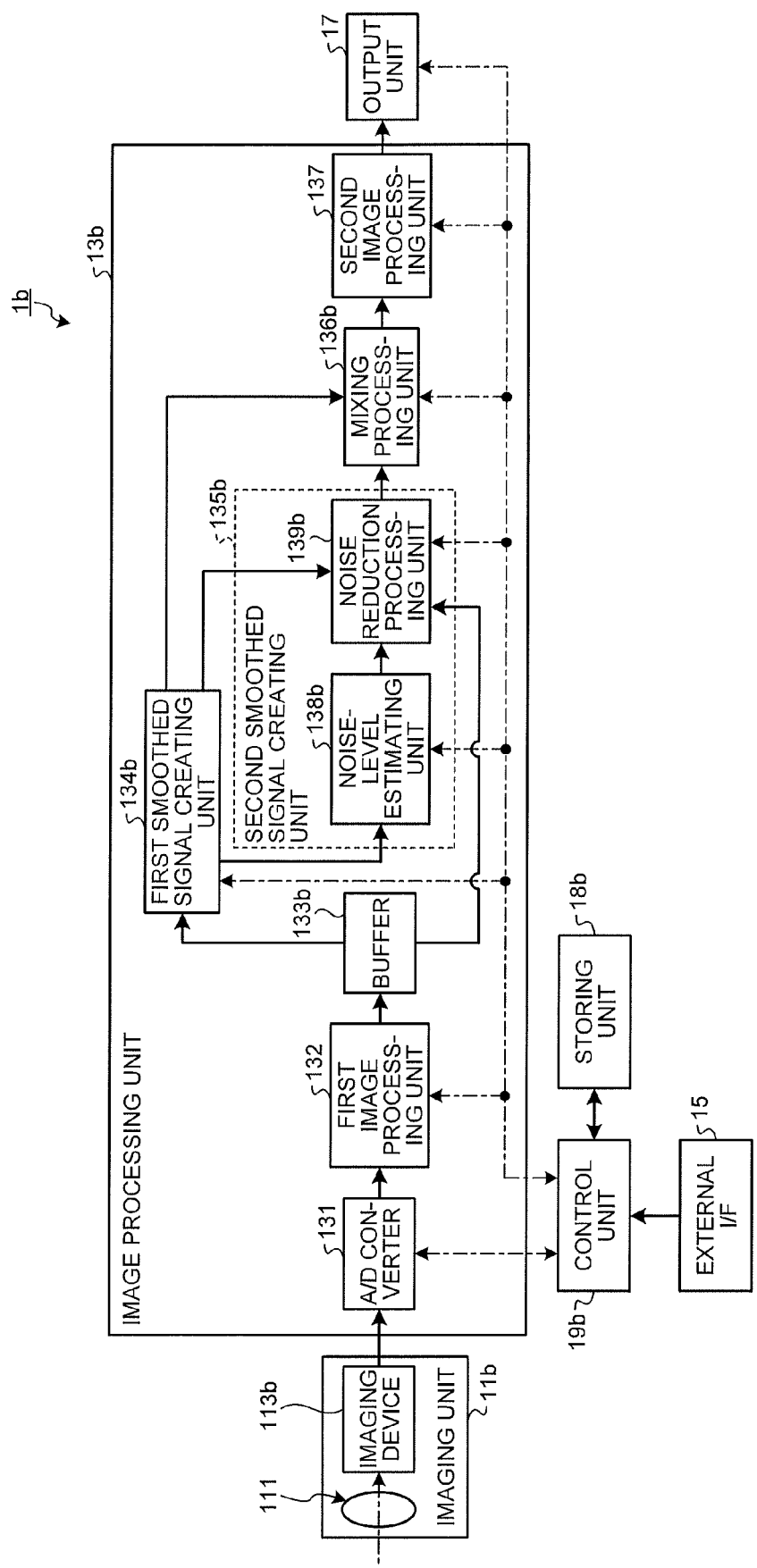
FIG. 15 is a block diagram illustrating the overall configuration of an imaging system according to a second embodiment.

In the following, a second embodiment will be described. FIG. 15 is a block diagram illustrating the overall configuration of an imaging system 1b according to a second embodiment. Components having the same configurations as those described in the first embodiment are assigned the same reference numerals. As illustrated in FIG. 15, the imaging system 1b according to the second embodiment includes an imaging unit 11b, an image processing unit 13b, the external I/F 15, the output unit 17, a storing unit 18b, and a control unit 19b that controls the operation of each unit.

Similarly to the first embodiment, the imaging unit 11b includes the lens system 111 and an imaging device 113b, such as a CCD or a CMOS. In the second embodiment, the imaging device 113b, which is assumed to be a monochrome imaging device, creates a monochrome image signal, and outputs it to the A/D converter 131 in the image processing unit 13b.

The image processing unit 13b includes the A/D converter 131, the first image processing unit 132, a buffer 133b, a first smoothed signal creating unit 134b, a second smoothed signal creating unit 135b, a mixing processing unit 136b, and the second image processing unit 137. The second smoothed signal creating unit 135b includes a noise-level estimating unit 138b and a noise reduction processing unit 139b. In the image processing unit 13b, the A/D converter 131, the first image processing unit 132, the buffer 133b, the first smoothed signal creating unit 134b, the noise-level estimating unit 138b, the noise reduction processing unit 139b, the mixing processing unit 136b, and the second image processing unit 137 are connected in this order. The buffer 133b is also connected to the noise reduction processing unit 139b. Furthermore, the first smoothed signal creating unit 134b is connected to the noise reduction processing unit 139b and the mixing processing unit 136b. As will be described later, a monochrome image signal, which is obtained by being processed by each unit forming the image processing unit 13b, is output from the second image processing unit 137 and is input to the output unit 17.

In the second embodiment, the buffer 133b temporarily stores therein a value of the image signal, which is subjected to the first image processing by the first image processing unit 132 and is output as an input signal, by sequentially updating the value of the input signal that is input from the first image processing unit 132. The input signal stored in the buffer 133b is read by the first smoothed signal creating unit 134b and the noise reduction processing unit 139b and is used for processes in these units.

The first smoothed signal creating unit 134b reads the value of the input signal stored in the buffer 133b and performs the first smoothing process on the input signal. In the second embodiment, the first smoothed signal creating unit 134b performs, as the first smoothing process, a smoothing process using, for example, a bilateral filter. The image signal that has been subjected to the first smoothing process is output to the mixing processing unit 136b as the first smoothed signal.

The smoothing process that is performed as the first smoothing process is not limited to the smoothing process using the bilateral filter. For example, it is possible to perform the smoothing process by appropriately using a known filter.

Figure 16:
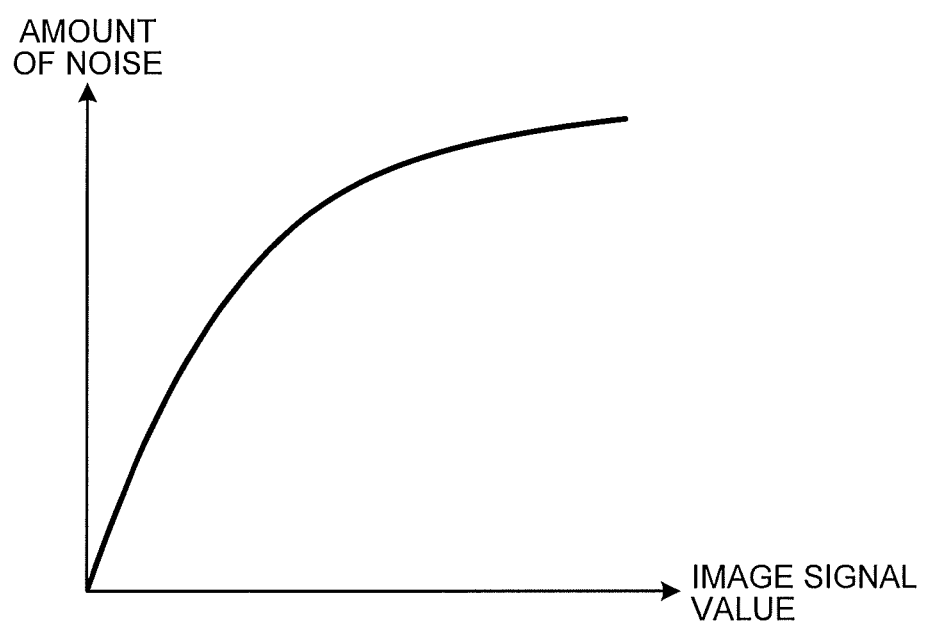
FIG. 16 is a schematic diagram illustrating an example of a noise generating model used in the second embodiment.

By using a gain adjustment value with respect to an image signal that is input from the imaging unit 11b, the noise-level estimating unit 138b in the second smoothed signal creating unit 135b estimates, in accordance with a predetermined noise generating model, the amount of noise contained in the first smoothed signal. The estimated amount of noise is output to the noise reduction processing unit 139b. The gain adjustment value is input from the control unit 19b. FIG. 16 is a schematic diagram illustrating an example of a noise generating model used in the second embodiment. In FIG. 16, the amount of noise is plotted against the value of the image signal. This noise generating model is the amount of modeled noise generated by the imaging device 113b to be used, is previously created, and is stored in the storing unit 18b. When the amount of noise is estimated, the noise-level estimating unit 138b refers to the noise generating model and obtains the amount of noise associated with a value of an image signal on the horizontal axis as the first image signal value. Then, the noise-level estimating unit 138b estimates, using the gain adjustment value, the amount of noise in accordance with the obtained amount of noise.

The noise reduction processing unit 139b included in the second smoothed signal creating unit 135b reads the value of the input signal stored in the buffer 133b and performs, in accordance with the amount of noise that is input from the noise-level estimating unit 138b and the first smoothed signal that is input from the first smoothed signal creating unit 134b, the noise reduction process on the input signal. The image signal that has been subjected to the noise reduction process is output to the mixing processing unit 136b as the second smoothed signal.

In the second embodiment, the noise-level estimating unit 138b performs a coring process on the input signal. Specifically, first, the noise-level estimating unit 138b obtains the difference value between a value of an input signal and a value of the first smoothed signal and compares the obtained difference value with the amount of noise. Then, for a part in which the difference value is smaller than the amount of noise, the noise-level estimating unit 138b determines the difference value to be noise and outputs the value of the first smoothed signal as the value of the second smoothed signal. In contrast, for a part in which the difference value is equal to or greater than the amount of noise, the noise-level estimating unit 138b determines the amount of noise in the difference value to be noise and outputs, as the value of the second smoothed signal, a signal value obtained by subtracting the amount of noise from the difference value and adding the obtained value to the first smoothed signal. In the second smoothed image signal, for a portion that is determined, as the result of the coring process, to be an edge instead of noise, the value of the input signal is maintained to some extent.

The mixing processing unit 136b mixes, in accordance with a predetermined mixing ratio, the first smoothed signal that is input from the first smoothed signal creating unit 134b and the second smoothed signal that is input from the second smoothed signal creating unit 135b. Each of the mixing ratios of the first smoothed signal and the second smoothed signal is determined using, for example, the method of determining the mixing ratio described as the modification of the first embodiment with reference to FIGS. 4 and 5; however, the mixing ratio can also be determined using another method of determining the mixing ratio. Specifically, each of the mixing ratios of the first smoothed signal and the second smoothed signal can be determined by appropriately using the methods described with reference to FIGS. 2, 3, and 6 to 11. The processed image signal is output to the second image processing unit 137 as the mixed image signal.

Figure 17:
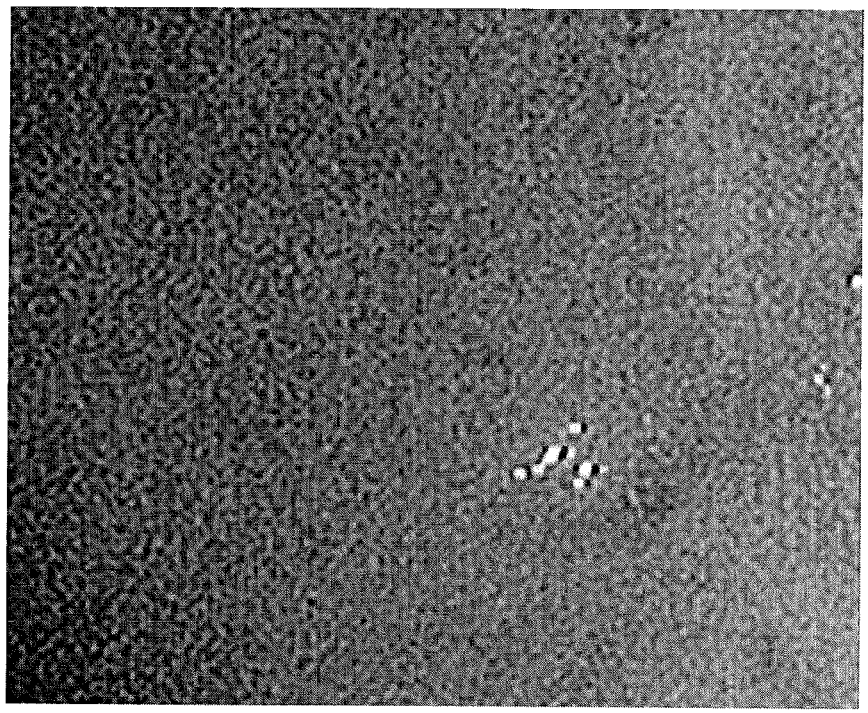
FIG. 17 is a schematic diagram illustrating an example of an input signal.
Figure 18:
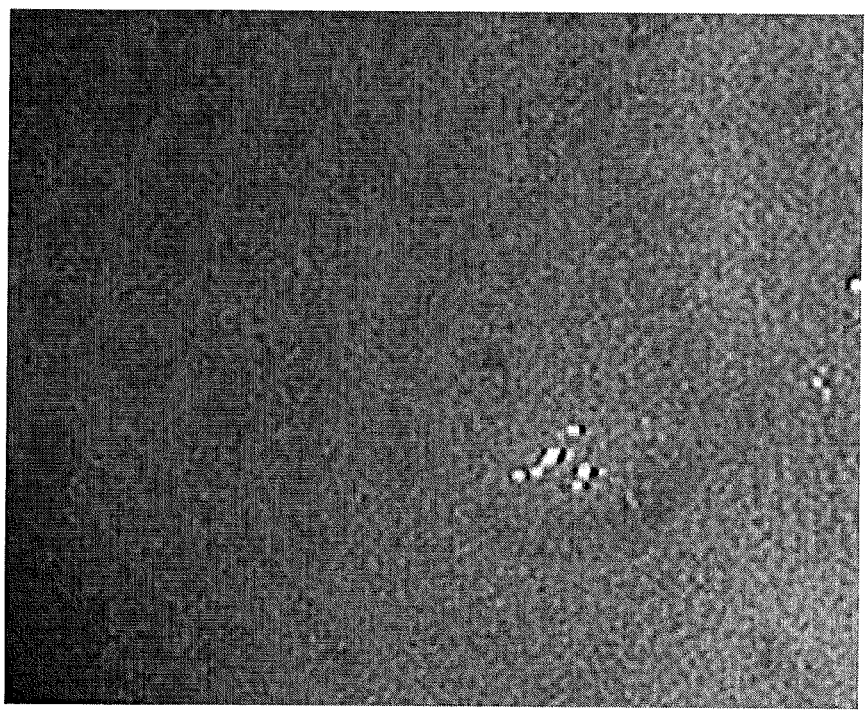
FIG. 18 is a schematic diagram illustrating an example of a mixed image signal, which is obtained using the second embodiment, for the input signal illustrated in FIG. 17.

FIG. 17 is a schematic diagram illustrating an example of an input signal. FIG. 18 is a schematic diagram illustrating an example of a mixed image signal, which is obtained using the second embodiment, with respect to the input signal illustrated in FIG. 17. In FIG. 17, the region of the right side is brighter than the region of the left side, indicating that the noise in the image in the region of the left side is higher than in that of the right side. If the second embodiment is used for the image illustrated in FIG. 17, as illustrated in FIG. 18, the noise is reliably reduced in the region of the left side, where the noise is relatively high in FIG. 17. Accordingly, it is possible to obtain an image in which noise is effectively reduced over the entire image.

As described above, according to the second embodiment, it is possible to create the first smoothed signal by performing the smoothing process, on the input signal, by using, for example, the bilateral filter. The noise generating model is previously created by modeling the amount of noise generated by the imaging device 113b to be used, which makes it possible to estimate the amount of noise contained in the first smoothed signal in accordance with the noise generating model. Then, in accordance with the estimated amount of noise, the noise reduction process is performed on the input signal, thus creating the second smoothed signal. Thereafter, it is possible to mix the first smoothed signal and the second smoothed signal at the mixing ratio according to, for example, the first smoothed signal. Accordingly, it is possible to mix the first smoothed signal obtained as the smoothed image signal in which edges are maintained and the second smoothed signal that is subjected to the noise reduction process in accordance with the frequency of noise generated by the imaging device 113b to be used.

Specifically, because the second smoothed image is created by estimating the amount of noise contained in the first smoothed signal and performing the noise reduction process, edges can be maintained when noise is reduced. Furthermore, with the smoothing process that is performed as the first smoothing process using the bilateral filter, as described in the first embodiment, because distance information between pixels is maintained, it is possible to perform the noise reduction process using the distance information. Accordingly, by mixing the second smoothed signal that has been subjected to the noise reduction process, in which edges are maintained and the distance information is used, and the first smoothed signal that is obtained as the smoothed image signal, in which edges are maintained as described above, noise can be reduced in a balanced manner by taking into consideration both the distance information and the edge information. Accordingly, it is possible to reduce the appearance of a portion in which noise is not effectively reduced and possible to obtain a noise reduction effect over the entire image, thus providing a high quality image.

Furthermore, the coring process is performed as the second smoothing process. Accordingly, because a portion that is defined as noise is subjected to the smoothing process and a portion that is defined as the edge instead of being defined as noise remains intact as the edge, the portion that is defined as the edge tends to appear as an isolated point; however, by mixing the second smoothed signal and the first smoothed signal, it is possible to alleviate the noise that remains as the isolated point.

In a similar manner as in the first embodiment, the image processing unit 13b in the second embodiment is not limited to hardware. Specifically, the CPU 211 in the computer system 200 illustrated in FIGS. 12 and 13 can also execute the image signal processing program, thus implementing it as software.

FIG. 19 is an overall flowchart illustrating the flow of a process performed by the CPU 211 according to the modification. As illustrated in FIG. 19, first, the CPU 211 receives, via a portable recording medium or from an external device using a communication connection, an image signal of an image captured by an imaging apparatus constituted by a monochrome imaging device (Step b1). Then, the CPU 211 performs the first image processing on the value of the image signal that is input at Step b1 (Step b3). Subsequently, the CPU 211 performs the first smoothing process, by using, for example, the bilateral filter on the image signal that has been subjected to the first image processing and creates the first smoothed signal (Step b5).

Then, the CPU 211 performs, in accordance with a predetermined noise generating model, a noise-level estimating process and estimates the amount of noise contained in the first smoothed signal (Step b7). The noise generating model that is used for this process is previously stored in, for example, the ROM 213 illustrated in FIG. 13. Subsequently, in accordance with the amount of noise estimated at Step b7 and the first smoothed signal created at Step b5, the CPU 211 performs, on the image signal that is input at Step b1, the noise reduction process, such as the coring process, and creates the second smoothed signal (Step b8). Then, the CPU 211 mixes the first smoothed signal created at Step b5 and the second smoothed signal at Step b7 at a predetermined mixing ratio and creates a mixed image signal (Step b9). In a similar manner as in the first embodiment, the mixing ratios of the first smoothed signal and the second smoothed signal are determined in accordance with any one of the input signal, the first smoothed signal and the second smoothed signal.

Then, the CPU 211 performs the second image processing on the mixed image signal (Step b11). Thereafter, the CPU 211 outputs an image signal that has been subjected to the second image processing (Step b13). For example, the CPU 211 displays, on the display 220 illustrated in FIG. 13, the image signal that has been subjected to the second image processing or stores the image signal in a predetermined recording medium, such as the USB memory 270.

Furthermore, in the second embodiment, the monochrome imaging device 113b is used as the imaging unit 11b; however, the imaging unit 11b is not limited to being used for the monochrome image signal. For example, the imaging unit 11b can also be used for a color image signal. Specifically, it is also possible to configure the imaging unit 11b using the single-plate imaging device 113 described in the first embodiment or configure the imaging unit 11b using a three-plate imaging device.

Furthermore, the present invention is not limited to the first embodiment, the second embodiment, or the modifications thereof described above. Modifications of components can be embodied as long as they do not depart from the spirit of the present invention. Furthermore, various inventions can be formed by appropriately combining a plurality of components disclosed in the above embodiments. For example, some components can be eliminated from all of the components described in the first embodiment, the second embodiment, or the modifications thereof described above. Furthermore, the above described components can also be appropriately used in combination in different embodiments. Various modifications and applications are possible as long as they do not depart from the spirit of the present invention.

As described above, an image signal processing apparatus, an image signal processing program, and an image signal processing method according to the present invention are suitable for reducing the appearance of a portion in which noise is not effectively reduced and for reliably obtaining a noise reduction effect over the entire image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image signal processing apparatus that performs a noise reduction process on an image signal of an image captured by an imaging device, the image signal processing apparatus comprising:
    a first smoothed signal creating unit that creates a first smoothed signal in which noise is reduced by performing a first smoothing process on the image signal;
    a second smoothed signal creating unit that creates a second smoothed signal in which noise is reduced by performing a second smoothing process that is different from the first smoothing process on the image signal, the second smoothed signal creating unit including:
        a noise-level estimating unit that estimates an amount of noise in accordance with both the first smoothed signal and a noise generating model that is previously set in relation to the imaging device; and
        a noise reduction processing unit that performs a noise reduction process on the image signal in accordance with the amount of noise and the first smoothed signal; and
    a mixing processing unit that mixes the first smoothed signal and the second smoothed signal in accordance with a mixing ratio according to a value indicated by any one of the image signal, the first smoothed signal, and the second smoothed signal.

2. The image signal processing apparatus according to claim 1, wherein the first smoothed signal creating unit performs a smoothing process, as the first smoothing process, on the image signal by using a bilateral filter.

3. The image signal processing apparatus according to claim 1, wherein the mixing processing unit mixes the first smoothed signal and the second smoothed signal by increasing a mixing ratio of the first smoothed signal as the value indicated by any one of the image signal, the first smoothed signal, and the second smoothed signal becomes smaller and by increasing a mixing ratio of the second smoothed signal as the value indicated by any one of the image signal, the first smoothed signal, and the second smoothed signal becomes larger.

4. The image signal processing apparatus according to claim 3, wherein when the value indicated by any one of the image signal, the first smoothed signal, and the second smoothed signal is equal to or greater than a first predetermined threshold, the mixing processing unit mixes the first smoothed signal and the second smoothed signal at a predetermined mixing ratio.

5. The image signal processing apparatus according to claim 3, wherein when the value indicated by any one of the image signal, the first smoothed signal, and the second smoothed signal is equal to or greater than a first predetermined threshold, the mixing processing unit mixes the first smoothed signal and the second smoothed signal at a first mixing ratio, and
    when the value indicated by any one of the image signal, the first smoothed signal, and the second smoothed signal is equal to or less than a second predetermined threshold and when the second predetermined threshold is less than the first predetermined threshold, the mixing processing unit mixes the first smoothed signal and the second smoothed signal at a second mixing ratio.

6. The image signal processing apparatus according to claim 1, wherein the second smoothed signal creating unit performs a smoothing process, for the first smoothing process, in which an edge is reliably maintained.

7. A non-transitory computer-readable storage medium with an executable program stored thereon for reducing noise of an image signal of an image captured by an imaging device, wherein the program instructs a microprocessor to perform:
creating a first smoothed signal in which noise is reduced by performing a first smoothing process on the image signal;
creating a second smoothed signal in which noise is reduced by performing a second smoothing process that is different from the first smoothing process on the image signal, creating the second smoothed signal including:
estimating an amount of noise in accordance with both the first smoothed signal and a noise generating model that is previously set in relation to the imaging device; and
performing a noise reduction process on the image signal in accordance with the amount of noise and the first smoothed signal; and
mixing the first smoothed signal and the second smoothed signal in accordance with a mixing ratio according to a value of any one of the image signal, the first smoothed signal, and the second smoothed signal.

8. An image signal processing method of performing a noise reduction process on an image signal of an image captured by an imaging device, the image signal processing method comprising:
creating a first smoothed signal in which noise is reduced by performing a first smoothing process on the image signal;
creating a second smoothed signal in which noise is reduced by performing a second smoothing process that is different from the first smoothing process on the image signal, creating the second smoothed signal including:
estimating an amount of noise in accordance with both the first smoothed signal and a noise generating model that is previously set in relation to the imaging device; and
performing a noise reduction process on the image signal in accordance with the amount of noise and the first smoothed signal; and
mixing the first smoothed signal and the second smoothed signal in accordance with a mixing ratio according to a value of any one of the image signal, the first smoothed signal, and the second smoothed signal.

* * * * *